(12) United States Patent
Jenkins et al.

(10) Patent No.: US 10,892,451 B2
(45) Date of Patent: **\*Jan. 12, 2021**

(54) BATTERY PACK LATCH MECHANISM

(71) Applicant: TTI (MACAO COMMERCIAL OFFSHORE) LIMITED, Macau (MO)

(72) Inventors: J. Luke Jenkins, Anderson, SC (US); Ryan Altenburger, Greenville, SC (US); William J. Saunders, Anderson, SC (US); Brent M. Willey, Anderson, SC (US); Li Sheng Ping, Dongguan (CN)

(73) Assignee: TTI (MACAO COMMERCIAL OFFSHORE) LIMITED, Macau (MO)

( \* ) Notice: Subject to any disclaimer, the term of this patent is extended or adjusted under 35 U.S.C. 154(b) by 105 days.

This patent is subject to a terminal disclaimer.

(21) Appl. No.: 16/210,448

(22) Filed: Dec. 5, 2018

(65) Prior Publication Data

US 2019/0109308 A1   Apr. 11, 2019

Related U.S. Application Data

(63) Continuation of application No. 15/459,344, filed on Mar. 15, 2017, now Pat. No. 10,158,105.

(60) Provisional application No. 62/309,118, filed on Mar. 16, 2016.

(51) Int. Cl.
*H01M 2/10* (2006.01)
*B25F 5/02* (2006.01)

(52) U.S. Cl.
CPC ............. *H01M 2/1061* (2013.01); *B25F 5/02* (2013.01); *H01M 2220/30* (2013.01)

(58) Field of Classification Search
CPC .................. H01M 10/052; H01M 10/0525
See application file for complete search history.

(56) References Cited

U.S. PATENT DOCUMENTS

| 3,999,110 A | 12/1976 | Ramstrom et al. |
| 4,084,123 A | 4/1978 | Lineback et al. |
| 4,871,629 A | 10/1989 | Bunyea |

(Continued)

FOREIGN PATENT DOCUMENTS

| EP | 2875910 A1 | 5/2015 |
| EP | 2258011 B1 | 12/2015 |
| WO | 2013/014873 A1 | 1/2013 |

OTHER PUBLICATIONS 1994-1995 Craftsman Catalog—9.6V Battery.
9.6v Craftsman Battery with Latching Mechanism.

*Primary Examiner* — Olatunji A Godo
(74) *Attorney, Agent, or Firm* — Michael Best & Friedrich LLP

(57) ABSTRACT

A rechargeable battery pack including a housing including a bottom wall and a top wall opposite the bottom wall, a plurality of battery cells at least partially positioned within the housing, and a latch mechanism. Where the latch mechanism includes a first linkage member having a contact surface accessible by the user from outside the housing, and where the contact surface is positioned proximate the bottom wall of the housing, a locking pawl movable with respect to the housing between a locked position and an unlocked position and in operable communication with the first linkage member, and where the locking pawl is positioned proximate the top wall of the housing.

20 Claims, 4 Drawing Sheets

(56) References Cited

U.S. PATENT DOCUMENTS

| | | |
|---|---|---|
| 5,122,427 A | 6/1992 | Flowers et al. |
| 5,401,592 A | 3/1995 | Gilpin et al. |
| 5,589,288 A | 12/1996 | Coulson et al. |
| 6,071,639 A | 6/2000 | Bryant et al. |
| 6,168,881 B1 | 1/2001 | Fischer et al. |
| 6,223,835 B1 | 5/2001 | Habedank et al. |
| 6,304,058 B2 | 10/2001 | Watson et al. |
| 6,326,101 B1 | 12/2001 | White et al. |
| 6,357,533 B1 | 3/2002 | Buchholz et al. |
| 6,412,572 B2 | 7/2002 | Habedank et al. |
| 6,500,581 B2 | 12/2002 | White et al. |
| 6,515,451 B2 | 2/2003 | Watson et al. |
| 6,525,511 B2 | 2/2003 | Kubale et al. |
| 6,562,509 B1 | 5/2003 | Eggert |
| 6,621,246 B2 | 9/2003 | Kubale et al. |
| 6,641,950 B2 | 11/2003 | White et al. |
| 6,653,815 B2 | 11/2003 | Watson et al. |
| 6,656,626 B1 | 12/2003 | Mooty et al. |
| 6,729,413 B2 | 5/2004 | Turner et al. |
| 6,840,335 B1 | 1/2005 | Wu |
| 6,876,173 B2 | 4/2005 | Mastaler et al. |
| 6,921,285 B2 | 7/2005 | Glauning |
| 6,955,549 B2 | 10/2005 | Brazell et al. |
| 6,965,214 B2 | 11/2005 | Kubale et al. |
| 7,005,831 B2 | 2/2006 | Watson et al. |
| 7,121,854 B2 | 10/2006 | Buck et al. |
| 7,125,270 B2 | 10/2006 | Buck et al. |
| 7,160,132 B2 | 1/2007 | Phillips et al. |
| 7,160,644 B2 | 1/2007 | White et al. |
| 7,243,734 B2 | 7/2007 | Wu |
| 7,351,077 B2 | 4/2008 | Shimizu et al. |
| 7,429,430 B2 | 9/2008 | Mooty et al. |
| 7,443,137 B2 | 10/2008 | Scott et al. |
| 7,453,234 B2 | 11/2008 | Phillips et al. |
| 7,455,544 B2 | 11/2008 | Glauning et al. |
| 7,554,287 B2 | 6/2009 | Duesselberg |
| 7,619,387 B2 | 11/2009 | Amend et al. |
| 7,638,233 B2 | 12/2009 | Vettoretti et al. |
| 7,648,383 B2 | 1/2010 | Matthias et al. |
| 7,661,486 B2 | 2/2010 | Turner et al. |
| 7,670,714 B2 | 3/2010 | Matthias |
| 7,682,726 B2 | 3/2010 | Rejman et al. |
| 7,746,030 B2 | 6/2010 | Ziegler et al. |
| 7,766,097 B2 | 8/2010 | Kondo |
| 7,816,888 B2 | 10/2010 | Rejman et al. |
| 7,828,185 B2 | 11/2010 | Hofmann et al. |
| 7,858,219 B2 | 12/2010 | Agehara et al. |
| 7,879,482 B2 | 2/2011 | Matthias |
| 7,887,942 B2 | 2/2011 | Rejman et al. |
| 7,940,025 B2 | 5/2011 | Duesselberg |
| 7,952,326 B2 | 5/2011 | Johnson et al. |
| 7,999,507 B2 | 8/2011 | Heinen |
| 8,163,414 B2 | 4/2012 | Wan et al. |
| 8,228,029 B2 | 7/2012 | Meyer et al. |
| 8,251,157 B2 | 8/2012 | Gray et al. |
| 8,312,937 B2 | 11/2012 | Turner et al. |
| 8,354,183 B2 | 1/2013 | Konuma et al. |
| 8,389,143 B2 | 3/2013 | Roskamp et al. |
| 8,557,427 B2 | 10/2013 | Matsumoto |
| 8,563,163 B2 | 10/2013 | Hayashi et al. |
| 8,573,322 B2 | 11/2013 | Nagasaka et al. |
| 8,573,324 B2 | 11/2013 | Turner et al. |
| 8,851,200 B2 | 10/2014 | Gray et al. |
| 8,984,711 B2 | 3/2015 | Ota et al. |
| 8,988,522 B2 | 3/2015 | Schneider et al. |
| 9,010,815 B2 | 4/2015 | Cooper |
| 9,172,115 B2 | 10/2015 | Kolden et al. |
| 9,196,881 B2 | 11/2015 | Gray et al. |
| 9,263,715 B2 | 2/2016 | Hamano et al. |
| 9,306,198 B2 | 4/2016 | Turner et al. |
| 9,337,452 B2 | 5/2016 | Ogura |
| 9,385,352 B2 | 7/2016 | Nguyen et al. |
| 10,158,105 B2 * | 12/2018 | Jenkins ................ B25F 5/02 |
| 2005/0058890 A1 | 3/2005 | Brazell et al. |
| 2005/0218867 A1 | 10/2005 | Phillips et al. |
| 2006/0199072 A1 | 9/2006 | Lui et al. |
| 2006/0222931 A1 | 10/2006 | Lin |
| 2007/0173090 A1 | 7/2007 | Johnson et al. |
| 2007/0218754 A1 * | 9/2007 | Ebine ................ H01M 2/30 |
| | | 439/500 |
| 2007/0238333 A1 | 10/2007 | Roehm et al. |
| 2007/0277987 A1 | 12/2007 | Meyer et al. |
| 2009/0246608 A1 | 10/2009 | Wu et al. |
| 2009/0255084 A1 | 10/2009 | Gee, II et al. |
| 2010/0129701 A1 | 5/2010 | Murayama et al. |
| 2010/0192314 A1 | 8/2010 | Otsuka et al. |
| 2011/0116861 A1 | 5/2011 | Zhang et al. |
| 2012/0251229 A1 | 10/2012 | Liang et al. |
| 2013/0139348 A1 | 6/2013 | Otsuka et al. |
| 2013/0164589 A1 | 6/2013 | Ota et al. |
| 2013/0196203 A1 | 8/2013 | Wackwitz et al. |
| 2013/0308253 A1 | 11/2013 | Ogura |
| 2014/0014386 A1 | 1/2014 | Turner et al. |
| 2014/0161513 A1 | 6/2014 | Chellew et al. |
| 2014/0240907 A1 | 8/2014 | Nguyen et al. |
| 2015/0099151 A1 | 4/2015 | Lavender |
| 2015/0140384 A1 | 5/2015 | Chellew et al. |
| 2015/0188102 A1 | 7/2015 | Gee, II et al. |
| 2015/0201170 A1 | 7/2015 | Schneider et al. |
| 2015/0318581 A1 | 11/2015 | Johnson et al. |
| 2015/0333301 A1 | 11/2015 | Ota et al. |
| 2016/0006014 A1 | 1/2016 | Kolden et al. |

* cited by examiner

BATTERY PACK LATCH MECHANISM

CROSS-REFERENCE TO RELATED APPLICATIONS

This patent application is a continuation of U.S. patent application Ser. No. 15/459,344 filed Mar. 15, 2017, now U.S. Pat. No. 10,158,105, which in turn is a formalization of Provisional Patent Application No. 62/309,118, filed Mar. 16, 2016, which is hereby incorporated by reference.

FIELD OF THE INVENTION

The invention relates to rechargeable battery packs, and more specifically to latch mechanisms for use with rechargeable battery packs.

BACKGROUND OF THE INVENTION

Rechargeable battery packs are necessary to provide electrical power to both power tools and other forms of electrically powered portable devices. As the power and capacity of these devices continues to grow, greater and greater power requirements must be met by the battery packs themselves. As a result, the size of the battery packs have generally increased over time as larger and more numerous cells are added to the designs. In such instances, the ergonomics of the battery pack may need to be modified so as to allow the user to grasp the larger battery pack housing and still have access to the necessary controls.

SUMMARY OF THE INVENTION

In one embodiment, a rechargeable battery pack includes a housing, a plurality of battery cells at least partially positioned within the housing, and a latch mechanism. The latch mechanism includes a first linkage member having a first end coupled to the housing, a second end opposite the first end and movable with respect to the housing, a contact surface accessible by the user from outside the housing, and a first engagement point defined on a surface opposite the contact surface. The latch mechanism also includes a second linkage member having a first end coupled to the housing, a second end opposite the first end and movable with respect to the housing, and a second engagement point positioned between the first end and the second end. Force is transmitted between the first linkage member and the second linkage member via the first engagement point and the second engagement point. The latch mechanism also includes a locking pawl coupled to the second end of the second linkage member, wherein the locking pawl is movable with respect to the housing between a locked position and an unlocked position.

In another embodiment, a rechargeable battery pack for use with an electrical device having a battery pack receptacle, the rechargeable battery pack including a housing defining a center axis extending longitudinally therethrough, a plurality of battery cells at least partially positioned within the housing, and a latch mechanism. The latch mechanism includes a first linkage member movably coupled to the housing, the first linkage member including a first engagement point. The latch mechanism also includes a second linkage member movably coupled to the housing, the second linkage member including a second engagement point in operable communication with the first engagement point, wherein force is transmitted between the first linkage member and the second linkage member via the first engagement point and the second engagement point. The latch mechanism includes a locking pawl coupled to the second linkage member and movable with respect to the housing between a locked position, in which the locking pawl is a first distance from the center axis, and an unlocked position, in which the locking pawl a second distance from the center axis, which is less than the first distance.

In another embodiment, a rechargeable battery pack including a housing including a bottom wall and a top wall opposite the bottom wall, a plurality of battery cells at least partially positioned within the housing, and a latch mechanism. Where the latch mechanism includes a first linkage member having a contact surface accessible by the user from outside the housing, and where the contact surface is positioned proximate the bottom wall of the housing, a locking pawl movable with respect to the housing between a locked position and an unlocked position and in operable communication with the first linkage member, and where the locking pawl is positioned proximate the top wall of the housing.

In another embodiment, a rechargeable battery pack including a housing having a bottom wall and a top wall opposite the bottom wall, a plurality of battery cells at least partially positioned within the housing, and a latch mechanism. Where the latch mechanism includes a first linkage member pivotable with respect to the housing about a first pivot axis, where the first linkage member includes a contact surface accessible by the user from outside the housing, and where the contact surface is positioned between the first pivot axis and the bottom wall of the housing, and a locking pawl movable with respect to the housing between a locked position and an unlocked position, and where pivoting the first linkage member relative to the housing causes the locking pawl to move between the locked and unlock positions.

In another embodiment, a rechargeable battery pack including a housing, a plurality of battery cells at least partially positioned within the housing, and a latch mechanism. Where the latch mechanism including a first linkage member having a contact surface accessible by the user from outside the housing, the first linkage member being pivotable with respect to the housing about a first pivot axis, a locking pawl in operable communication with the first linkage member and pivotable with respect to the housing about a second pivot axis between a locked position and an unlocked position, and where the first pivot axis is different than the second pivot axis.

Other aspects of the invention will become apparent by consideration of the detailed description and accompanying drawings.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
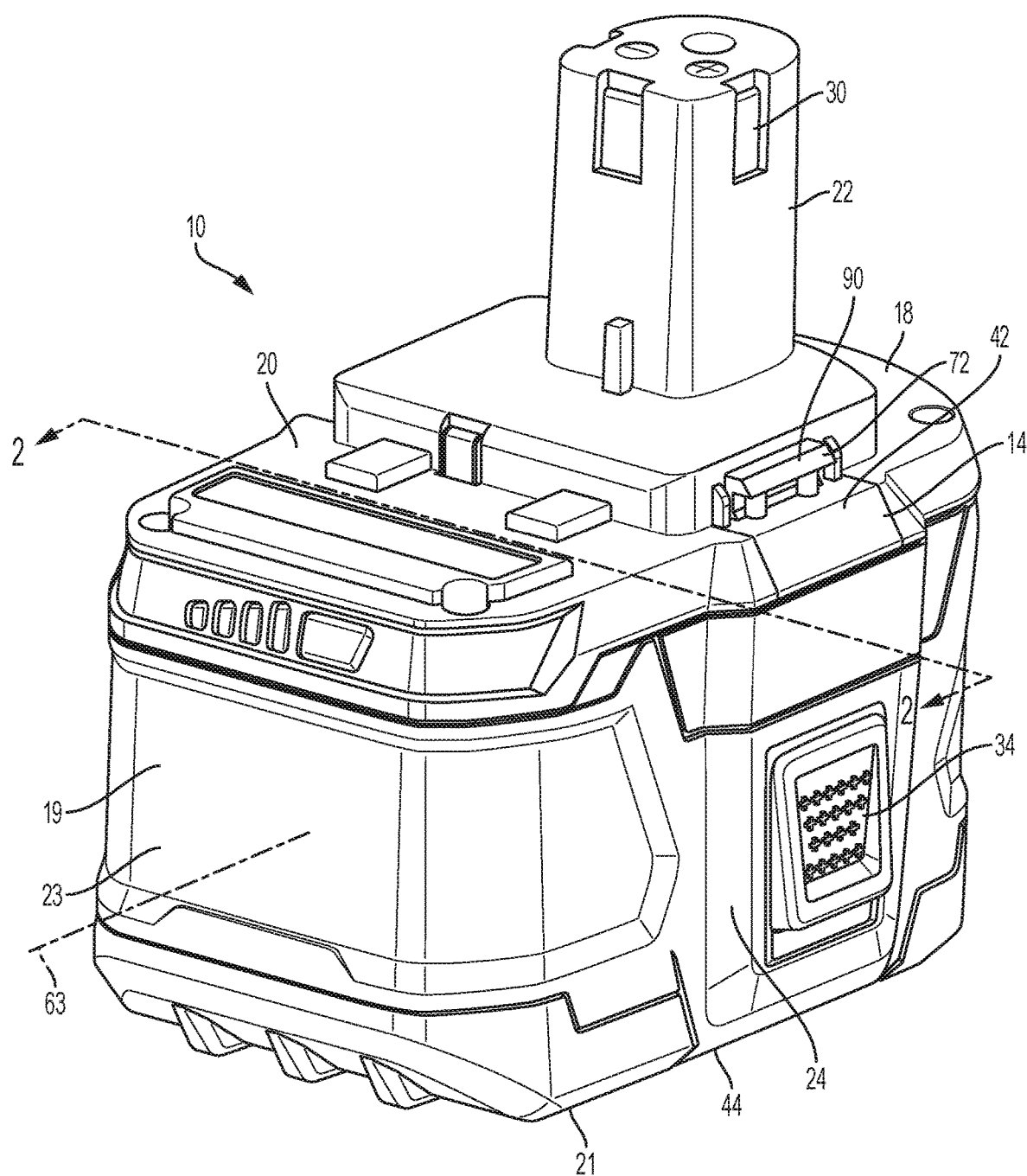
FIG. 1 is a perspective view of a battery pack.
Figure 2:
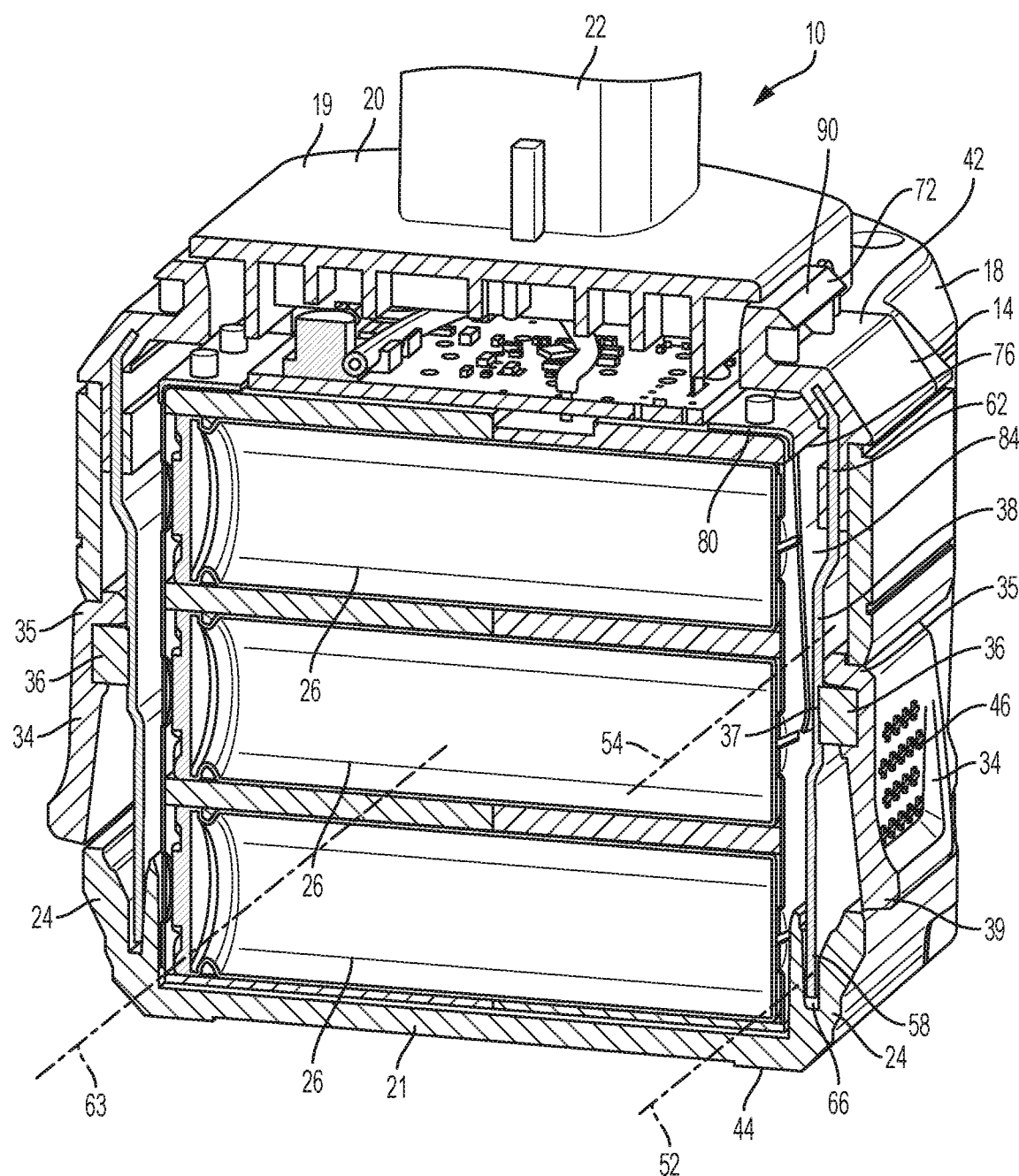
FIG. 2 is a section view of the battery pack take along line 2-2 in FIG. 1.

FIGS. 1-2 illustrate a rechargeable battery pack 10 including a latch mechanism 14 according to one embodiment of the invention. The battery pack 10 includes a housing 18 having battery cells 26 positioned therein, and a pair of latch mechanisms 14 positioned on opposite sides of the housing 18 and each being configured to releasably couple the battery pack 10 to a power tool or other device (not shown). During use, at least a portion of the housing 18 is configured to be inserted into a battery pack receptacle (not shown) of a corresponding power tool or other electrical device to bring the electrical contacts 30 of the battery pack 10 into electrical communication with the power tool. Furthermore, the latching mechanisms 14 are configured to releasable secure the battery pack 10 within the receptacle during use.

The housing 18 of the battery pack 10 includes a base portion 19 and a connecting or tower portion 22 extending from the base portion 19. The base portion 19 of the housing 18 is substantially rectangular in shape having a top wall 20, a bottom wall 21 opposite the top wall 20, a front wall 23 extending between the top wall 20 and the bottom wall 21, and a pair of sidewalls 24 spaced a distance from one another and extending between the top wall 20 and the bottom wall 21. The housing 18 also includes a center axis 63 extending longitudinally through the base portion 19.

The tower portion 22 of the housing extends outwardly from the top wall 20 of the base portion 19. The tower portion 22 also includes one or more electrical contacts 30 (described above) configured to engage electrical contacts (not shown) of the battery pack receptacle when the tower portion 22 is positioned therein.

Illustrated in FIGS. 1-2, each latch mechanism 14 of the rechargeable battery pack 10 is substantially similar in layout and operation. As such, only one latch mechanism 14 will be described in detail herein. The latch mechanism 14 includes a first linkage member or button 34, a second linkage member 38, and a locking pawl 42 coupled to the second linkage member 38 and configured to selectively engage a corresponding locking aperture (not shown) of the battery pack receptacle. During use, the latch mechanism 14 is adjustable between a locked position, in which the tower portion 22 of the battery pack 10 cannot be removed from the receptacle, and an unlocked position, in which the tower portion 22 is removable from the receptacle.

In the illustrated embodiment of the latch mechanism 14, the button 34 is not directly in contact with the locking pawl 42. Rather, the button 34 is in operable communication with the pawl 42 through the second linkage member 38. As such, the latch mechanism 14 permits the button 34 to be positioned away from the locking pawl 42 and in a more ergonomically advantageous position without having to modify the shape of the housing 18. Such a configuration is particularly useful with larger sized battery packs where a user's hands are not be able to completely grasp the housing 18, generally requiring the buttons 34 to be placed away from the locking pawls 42 and proximate the bottom wall 21 of the housing 18. Thereby, the button 34 is positioned where it is more easily grasped by a user, while the locking pawl 42 remains proximate the top wall 20 of the housing 18 and closer to the corresponding locking aperture in the battery receptacle. The linkage of the latch mechanism 14 also provides a mechanical advantage to the user's inputs such that one of the force or distance being applied to the button 34 is magnified at the locking pawl 42.

Figure 3:
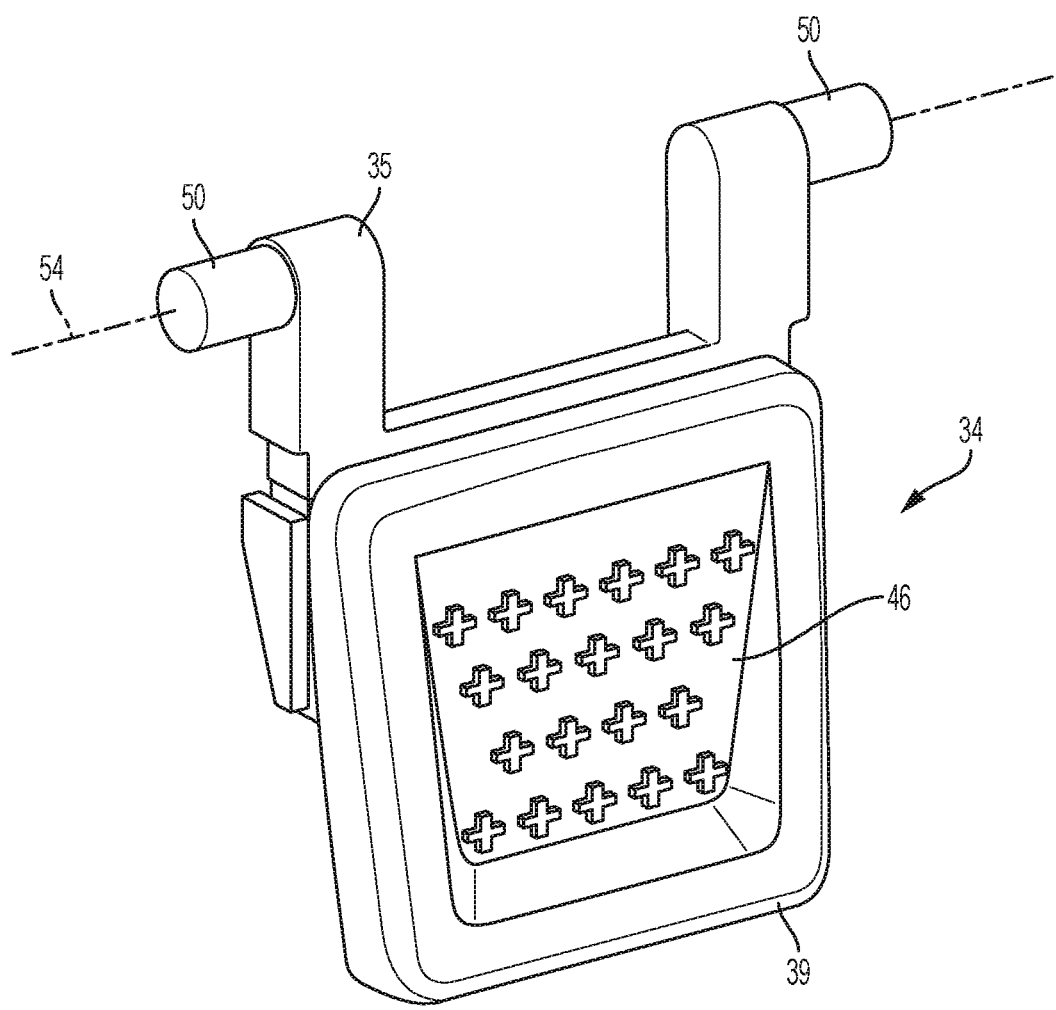
FIG. 3 is a perspective view of an actuator of the battery pack.

Illustrated in FIGS. 1-3, the button 34 of the latch mechanism 14 is pivotably coupled to the housing 18 of the battery pack 10 and positioned such that it may be easily accessed by the user. The button 34 is generally positioned proximate the bottom 44 of the battery pack housing 18 (i.e., opposite the tower portion 22) such that when the user grasps the battery pack 10, the buttons 34 of both latch mechanisms 14 are easily accessible by the user's thumb and forefinger simultaneously.

The button 34 is substantially rectangular in shape having a first end 35 and a second end 39 opposite the first end 35. The button 34 also includes a contact surface 46 accessible from outside the housing 18 and positioned proximate the second end 39. A user applies force against the contact surface 46 (e.g., toward the center axis 63) to actuate the latch mechanism 14 and move the latch mechanism 14 between the locked position, in which the contact surface 46 is a first distance from the center axis 63, and an unlocked position, in which the contact surface 46 is a second distance from the center axis 63. The second distance is smaller than the first distance. The button 34 also includes a pair of pivoting ears 50 positioned proximate the first end 35 that are pivotably supported by the housing 18. The ears 50 also define a first axis 54 about which the button 34 pivots with respect to the housing 18 during use. In other embodiments, the button 34 may be linearly movable with respect to the housing 18 between the locked position and the unlocked position.

The button 34 also includes a first engagement point or member 36 positioned opposite the contact surface 46 and between the pivoting ears 50. The first engagement member 36 engages the second linkage member 38 and transmits force therebetween. In the illustrated embodiment, the first engagement member 36 includes a bar coupled to the button 34 (FIG. 2); however in other embodiments the first engagement member 36 may include a hinge, splines, pad, protrusion coupled to or integrally formed with the button 34, or other members able to transmit force between the button 34 and the second linkage member 38. Together, the contact surface 46, pivoting ears 50, and engagement member 36 form a class 2 lever.

Illustrated in FIG. 2, the second linkage member 38 is an elongated piece of resiliently deformable material having a first end 58 coupled to the housing 18, and a second end 62 opposite the first end 58 and directly coupled to the locking pawl 42. The second linkage member 38 also includes a second engagement point or member 37 in operable communication with the first engagement member 36 of the button 34. In the illustrated embodiment, the second engagement member 37 is the location or surface area at which the first engagement member 36 contacts the second linkage member 38. In further embodiments, the second engagement member 37 may include a bar, a ridge, protrusion, or the like coupled to or integrally formed with the linkage.

During use, the first engagement member 36 of the button 34 contacts the second linkage member 38 at the second engagement member 37 (e.g., between the first end 58 and the second end 62) causing the second linkage member 38 to move about a second axis 52 positioned proximate its first end 58 (e.g., elastically deforms about the first end 58). In turn, the motion of the second linkage member 38 about the second axis 52 causes the second end 62 to move between a locked position, in which the second end 62 is positioned a first distance from the center axis 63 of the battery pack 10, and an unlocked position, in which the second end 62 is positioned a second distance, which is less than the first distance, from the center axis 63 of the battery pack 10. In the illustrate embodiment, the second axis 52 is substantially parallel the first axis 54. Together, the first end 58, the second end 62, and the second engagement member 37 form a class 3 lever.

In the illustrated embodiment, the first end 58 of the second linkage member 38 is fixedly coupled to the housing 18 within a slot 66 formed in the housing 18. During movement, the body of the second linkage member 38 deforms in order to permit the second end 62 to move about the second axis 52 between the locked and unlocked positions. In other embodiments, the first end 58 of the second linkage member 38 may be pivotably coupled to the housing 18 by a lug, hinge, or the like to permit the second end 62 to move without deforming the body of the second linkage member 38.

Figure 4:
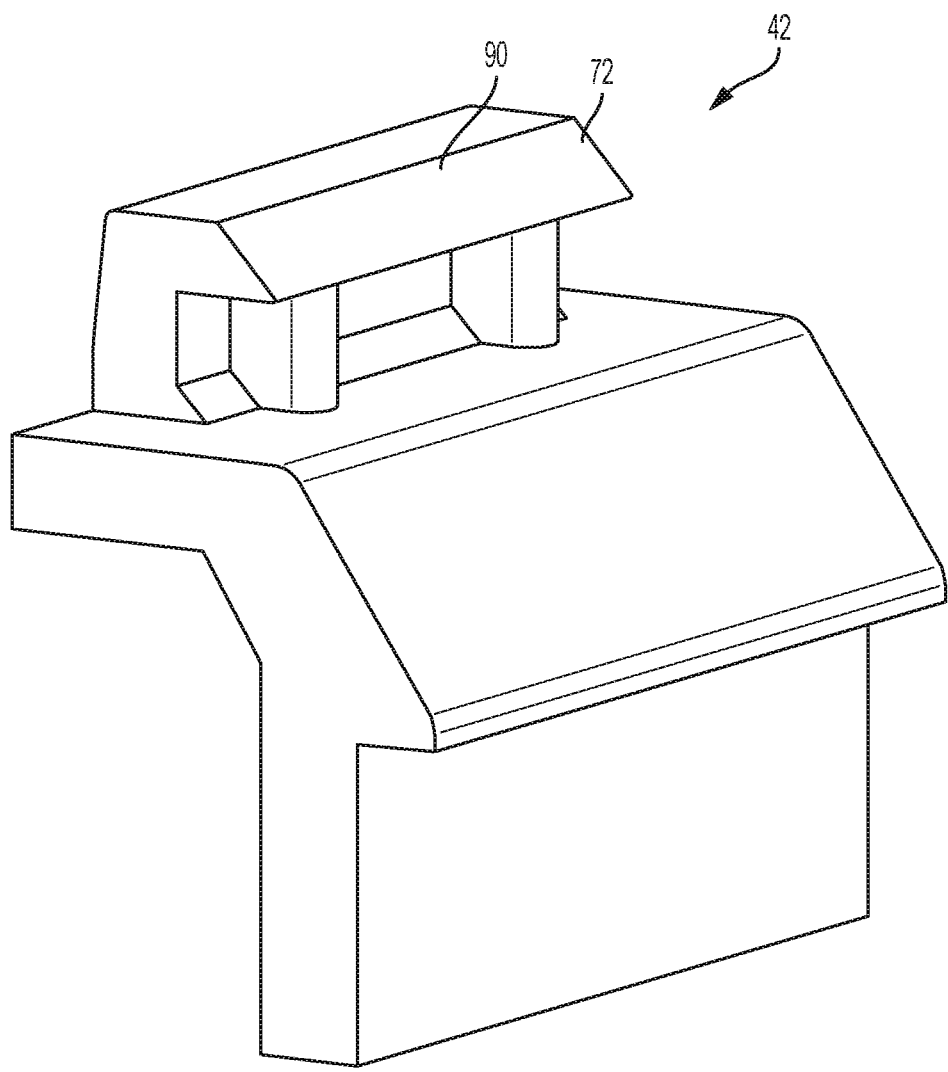
FIG. 4 is a perspective view of a pawl member of the battery pack.

Illustrated in FIGS. 2 and 4, the locking pawl 42 of the latch mechanism 14 is generally L-shaped and includes a tooth 72 sized and shaped to engage a corresponding aperture (not shown) formed in the battery pack receptacle of the power tool. Once assembled, the locking pawl 42 is directly coupled to the second end 62 of the second linkage member 38 and movable therewith. Specifically, the locking pawl 42 moves with respect to the housing 18 between a locked position, in which the locking pawl 42 is positioned away from the center axis 63 of the housing 18 (FIG. 1), and an unlocked position, in which the locking pawl 42 is positioned closer to the center axis 63 of the housing 18 (not shown). That is, the locking pawl 42 is adjustable with respect to the housing 18 between a locked position, in which the tooth 72 engages the corresponding locking aperture of the battery pack receptacle when the tower portion 22 is inserted therein, and an unlocked position, in which the tooth 72 does not engage the corresponding locking aperture of the receptacle when the tower portion 22 is inserted therein. In other embodiments, the locking pawl 42 may include more than one tooth (not shown).

Illustrated in FIG. 2, the latch mechanism 14 also includes a biasing member 76 coupled to the housing 18 and configured to bias the latch mechanism 14 toward the locked configuration. More specifically, the biasing member 76 includes a length of resiliently deformable material (i.e., metal) having a first end 80 coupled to the housing 18, and a second end 84 moveable with respect to the first end 80. When assembled, the second end 84 of the biasing member 76 generally engages the second linkage member 38, applying force away from the center of the housing 18 and therefore biasing the second linkage member 38 toward the locked position.

While the illustrated embodiment includes two latch mechanisms 14, each positioned opposite one another on a respective sidewall 24 of the housing 18, it is to be understood that fewer or more latch mechanisms 14 may be included as necessary to releasably secure the rechargeable battery pack 10 to the corresponding power tool or electrical device.

To couple the battery pack 10 to a corresponding power tool, the user grasps the housing 18 proximate the bottom 44 and inserts the tower portion 22 into the battery pack receptacle. The user then continues to advance the tower portion 22 into the battery pack receptacle, causing the locking pawl 42 of both latch mechanisms 14 to automatically bias from the locked position, toward the unlocked position (i.e., inwardly toward the center axis 63 of the housing 18) as an inner wall defining the receptacle contacts a beveled surface 90 of the teeth 72.

The tower portion 22 continues to advance into the battery pack receptacle until the contacts 30 of the battery pack 10 are in electrical communication with the power tool. Furthermore, the tooth 72 of each locking pawl 42 becomes aligned with the locking aperture of the receptacle, at which time the force of the biasing member 76 causes the locking pawl 42 to automatically bias from the unlocked position toward the locked position and into the locking aperture. Once the locking pawl 42 is in the locked position, the battery pack 10 may not be removed from the receptacle.

To remove the battery pack 10 from the power tool, the user must first grasp the bottom 44 of the housing 18 such that the user's fingers contact both buttons 34 of the two latch mechanisms 14. The user then applies force to both buttons 34, squeezing inwardly toward the center axis 63 and causing the buttons 34 to pivot about the first axis 54 from the locked positioned to the unlocked position (e.g., the distance between the two buttons 34 decreases).

As the buttons 34 pivot inwardly about the first axis 54, the first engagement member 36 of the button 34 contacts the second engagement member 37 of the second linkage member 38 causing the second end 62 of the second linkage member 38 to move from the locked position and toward the unlocked position (i.e., inwardly toward the center axis 63 of the housing 18). As the second end 62 moves toward the center of the housing 18, the locking pawl 42, which is attached thereto, also moves from the locked position to the unlocked position (i.e., inwardly toward the center of the housing 18). As such, the distance between the two locking pawls 42 decreases.

As both locking pawls 42 move from the locked to the unlocked positions, the teeth 72 of both pawls 42 exit the respective locking apertures of the power tool thereby allowing the tower portion 22 to be removed from the battery pack receptacle.

Although the invention has been described in detail with reference to certain preferred embodiments, variations and modifications exist within the scope and spirit of one or more independent aspects of the invention as described.

What is claimed is:

1. A rechargeable battery pack comprising:
   a housing including a bottom wall and a top wall opposite the bottom wall;
   a plurality of battery cells at least partially positioned within the housing; and
   a latch mechanism comprising:
      a first linkage member having a contact surface accessible by the user from outside the housing, and wherein the contact surface is positioned proximate the bottom wall of the housing;
      a locking pawl movable with respect to the housing between a locked position and an unlocked position and in operable communication with the first linkage member, wherein the locking pawl is positioned proximate the top wall of the housing.

2. The rechargeable battery pack of claim 1, wherein the locking pawl is movable a first distance with respect to the housing between a locked position and an unlocked position, and wherein the first linkage member is movable with respect to the housing a second distance with respect to the housing between a locked position and an unlocked position, and wherein the first distance is different than the second distance.

3. The rechargeable battery pack of claim 2, wherein the first distance is greater than the second distance.

4. The rechargeable battery pack of claim 1, further comprising a tower portion extending outwardly from the top wall to support one or more electrical contacts.

5. The rechargeable battery pack of claim 1, wherein the first linkage member is pivotable with respect to the housing about a first pivot axis, and wherein the contact surface is positioned between the first pivot axis and the bottom wall.

6. The rechargeable battery pack of claim 5, wherein the locking pawl is pivotable with respect to the housing about a second pivot axis, and wherein the pawl is positioned between the second pivot axis and the top wall.

7. The rechargeable battery pack of claim 1, wherein the locking pawl is pivotable with respect to the housing about a second pivot axis, and wherein the pawl is positioned between the second pivot axis and the top wall.

8. A rechargeable battery pack comprising:
a housing including a bottom wall and a top wall opposite the bottom wall;
a plurality of battery cells at least partially positioned within the housing; and
a latch mechanism comprising:
a first linkage member pivotable with respect to the housing about a first pivot axis, where the first linkage member includes a contact surface accessible by the user from outside the housing, and wherein the contact surface is positioned between the first pivot axis and the bottom wall of the housing, and
a locking pawl movable with respect to the housing between a locked position and an unlocked position, and wherein pivoting the first linkage member relative to the housing causes the locking pawl to move between the locked and unlock positions.

9. The rechargeable battery pack of claim 8, wherein the locking pawl is positioned proximate to the top wall of the housing.

10. The rechargeable battery pack of claim 8, wherein the locking pawl pivots with respect to the housing about a second pivot axis different than the first pivot axis.

11. The rechargeable battery pack of claim 10, wherein the locking pawl is positioned between the second pivot axis and the top wall of the housing.

12. The rechargeable battery pack of claim 10, wherein the first pivot axis is parallel the second pivot axis.

13. The rechargeable battery pack of claim 8, further comprising a tower portion extending outwardly from the top wall to produce one or more electrical contacts.

14. A rechargeable battery pack comprising:
a housing;
a plurality of battery cells at least partially positioned within the housing;
a latch mechanism comprising:
a first linkage member having a contact surface accessible by the user from outside the housing, the first linkage member being pivotable with respect to the housing about a first pivot axis;
a locking pawl in operable communication with the first linkage member and pivotable with respect to the housing about a second pivot axis between a locked position and an unlocked position, and wherein the first pivot axis is different than the second pivot axis.

15. The rechargeable battery pack of claim 14, wherein the housing includes a top wall and a bottom wall opposite the top wall, and wherein the contact surface is positioned between the first pivot axis and the bottom wall.

16. The rechargeable battery pack of claim 14, wherein the housing includes a top wall and a bottom wall opposite the top wall, and wherein the locking pawl is positioned between the second pivot axis and the top wall.

17. The rechargeable battery pack of claim 14, wherein the first pivot axis is parallel to the second pivot axis.

18. The rechargeable battery pack of claim 14, further comprising a second latch mechanism comprising:
a second linkage member having a second contact surface accessible by the user from outside the housing, the second linkage member being pivotable with respect to the housing about a third pivot axis,
a second locking pawl in operable communication with the second linkage member and pivotable with respect to the housing about a fourth pivot axis between a locked position and an unlocked position, and wherein the third pivot axis is different than the fourth pivot axis.

19. The rechargeable battery pack of claim 18, wherein reducing the distance between the first linkage member and the second linkage member causes at least one of the first locking pawl and the second locking pawl to move toward the unlocked position.

20. The rechargeable battery pack of claim 18, wherein the first latch mechanism and the second latch mechanism are operable independently of one another.

* * * * *